United States Patent
Hong et al.

(10) Patent No.: US 11,062,521 B2
(45) Date of Patent: Jul. 13, 2021

(54) VIRTUALITY-REALITY OVERLAPPING METHOD AND SYSTEM

(71) Applicant: INSTITUTE FOR INFORMATION INDUSTRY, Taipei (TW)

(72) Inventors: Jia-Wei Hong, Taichung (TW); Jing-Tong Fu, Hsinchu County (TW); Ming-Fang Weng, Kinmen County (TW)

(73) Assignee: INSTITUTE FOR INFORMATION INDUSTRY, Taipei (TW)

( * ) Notice: Subject to any disclaimer, the term of this patent is extended or adjusted under 35 U.S.C. 154(b) by 132 days.

(21) Appl. No.: 16/676,074

(22) Filed: Nov. 6, 2019

(65) Prior Publication Data

US 2021/0090339 A1 Mar. 25, 2021

(30) Foreign Application Priority Data

Sep. 20, 2019 (TW) ................. 108134127

(51) Int. Cl.
*G06T 19/00* (2011.01)
*G06K 9/00* (2006.01)
*G06T 7/73* (2017.01)
*G06T 7/60* (2017.01)
*G06T 7/13* (2017.01)

(52) U.S. Cl.
CPC ........ *G06T 19/006* (2013.01); *G06K 9/00201* (2013.01); *G06T 7/13* (2017.01); *G06T 7/60* (2013.01); *G06T 7/73* (2017.01); *G06T 2207/10028* (2013.01); *G06T 2210/56* (2013.01)

(58) Field of Classification Search
None
See application file for complete search history.

(56) References Cited

U.S. PATENT DOCUMENTS

| | | | |
|---|---|---|---|
| 2018/0176541 A1* | 6/2018 | Abbas | G06T 7/33 |
| 2019/0026922 A1* | 1/2019 | Kellogg | G06K 9/00208 |
| 2019/0026948 A1* | 1/2019 | Kellogg | G06T 7/246 |
| 2019/0355121 A1* | 11/2019 | Nelson | G06T 17/10 |
| 2020/0013187 A1* | 1/2020 | Hong | G01B 11/002 |
| 2020/0242835 A1* | 7/2020 | Cherukuri | G06T 7/579 |

FOREIGN PATENT DOCUMENTS

CN 109886961 A 6/2019

* cited by examiner

*Primary Examiner* — Jennifer Mehmood
*Assistant Examiner* — Jed-Justin Imperial
(74) *Attorney, Agent, or Firm* — Birch, Stewart, Kolasch & Birch, LLP

(57) ABSTRACT

A virtuality-reality overlapping method is provided. A point cloud map related to a real scene is constructed. Respective outline border vertexes of a plurality of objects are located by using 3D object detection. According to the outline border vertexes of the objects, the point cloud coordinates of the final candidate outline border vertexes are located according to the screening result of a plurality of projected key frames. Then, the point cloud map is projected to the real scene for overlapping a virtual content with the real scene.

14 Claims, 12 Drawing Sheets

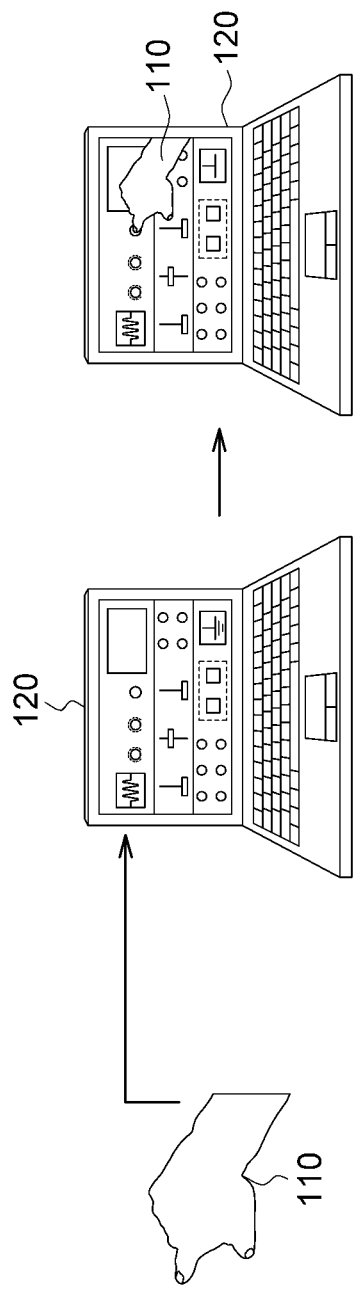
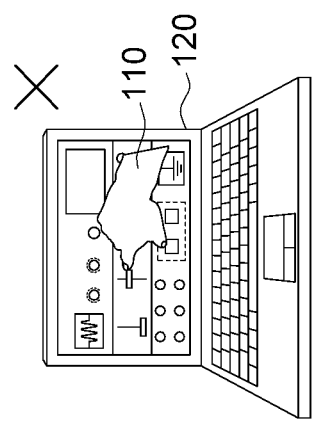
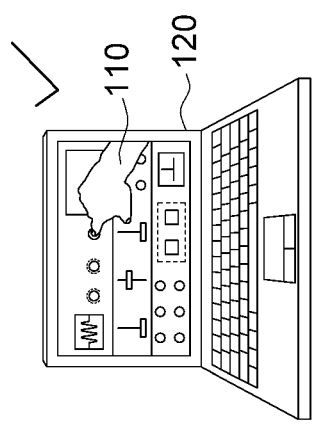
FIG. 1
FIG. 2A
FIG. 2B

VIRTUALITY-REALITY OVERLAPPING METHOD AND SYSTEM

This application claims the benefit of Taiwan application Serial No. 108134127, filed Sep. 20, 2019, the subject matter of which is incorporated herein by reference.

BACKGROUND OF THE INVENTION

Field of the Invention

The invention relates in general to a virtuality-reality overlapping method and system.

Description of the Related Art

Information visualization technology, such as augmented reality or mixed reality, is integrated on smart devices to achieve virtuality-reality overlapping by way of image processing, computer vision and computer graphics. Virtuality-reality overlapping refers to the technology of overlapping a virtual content with a real content. The virtual content refers to the model, the image or the animation created by the user or generated from data. The real content refers to the point cloud map model constructed by scanning the object or the scene in the real world.

The purpose and basic requirement of virtuality-reality overlapping is for quickly and accurately overlapping a virtual content with a physical space (that is, overlapping a virtual content with a real content or a real scene). FIG. 1 is an example of virtuality-reality overlapping. As indicated in FIG. 1, a virtual content 110 is overlapped with a real scene 120.

In terms of current technologies, the virtuality-reality overlapping technology may be subjected to the following problems: (1) Since the constructed map has a high degree of freedom, the precision of virtuality-reality overlapping will drop and tracking miss rate will increase if the constructed map is biased or skewed; and (2) If the scale of each constructed map is not consistent, an additional space transformation between the map and the real scene is required, and the efficiency will therefore decrease. FIG. 2A is an example of virtuality-reality overlapping with better effect. FIG. 2B is an example of virtuality-reality overlapping with poor effect because the virtual content 110 is not overlapped at the required position.

Therefore, the invention provides a virtuality-reality overlapping system and method to resolve the above problems and other problems as well.

SUMMARY OF THE INVENTION

According to an embodiment of the present invention, a virtuality-reality overlapping method is provided. The method includes: shooting a real scene by an image capture device to construct a point cloud map; storing a plurality of key frames in a memory device; projecting the point cloud map to each of the key frames to obtain a plurality of projected key frames; performing three-dimension (3D) object detection to each of the projected key frames to locate respective outline border vertexes of a plurality of objects in each of the projected key frames; for each of the projected key frames, locating the point cloud coordinates of a plurality of target outline border vertexes from the point cloud map according to the outline border vertexes of the objects, wherein, for each of the projected key frames, the point cloud coordinates of the target outline border vertexes respective are closest to the outline border vertexes on the point cloud map; for each of the projected key frames, locating the point cloud coordinates of a plurality of candidate outline border vertexes corresponding to the point cloud coordinates of the target outline border vertexes from the point cloud map; collecting the statistics of the point cloud coordinates of the candidate outline border vertexes of the projected key frames to locate the point cloud coordinates of a plurality of final candidate outline border vertexes corresponding to the outline border vertexes from the point cloud map; calculating a proportion relationship between the objects and the point cloud map according to the point cloud coordinates of the final candidate outline border vertexes to project the point cloud map to the real scene; and transmitting the constructed point cloud map to a wearable device, which accordingly creates a virtual content and further overlaps the virtual content with the real scene.

According to another embodiment of the present invention, a virtuality-reality overlapping system including a computing device and a wearable device is provided. The computing device includes a memory device. The wearable device is coupled to the computing device. An image capture device shoots a real scene, and the computing device constructs a point cloud map. The computing device stores a plurality of key frames in the memory device. The computing device projects the point cloud map to each of the key frames to obtain a plurality of projected key frames. The computing device performs 3D object detection to each of the projected key frames to locate respective outline border vertexes of a plurality of objects in each of the projected key frames. For each of the projected key frames, the computing device locates the point cloud coordinates of a plurality of target outline border vertexes from the point cloud map according to the outline border vertexes of the objects, wherein, for each of the projected key frames, the point cloud coordinates of the target outline border vertexes respective are closest to the outline border vertexes on the point cloud map. For each of the projected key frames, the computing device locates the point cloud coordinates of a plurality of candidate outline border vertexes corresponding to the point cloud coordinates of the target outline border vertexes from the point cloud map. The computing device collects the statistics of the point cloud coordinates of the candidate outline border vertexes of the projected key frames to locate the point cloud coordinates of a plurality of final candidate outline border vertexes corresponding to the outline border vertexes from the point cloud map. The computing device calculates a proportion relationship between the objects and the point cloud map to project the point cloud map to the real scene according to the point cloud coordinates of the final candidate outline border vertexes. The computing device transmits the constructed point cloud map to the wearable device, which accordingly creates a virtual content and further overlaps the virtual content with the real scene.

The above and other aspects of the invention will become better understood with regards to the following detailed description of the preferred but non-limiting embodiment(s). The following description is made with reference to the accompanying drawings.

BRIEF DESCRIPTION OF THE DRAWINGS

FIG. 1 is an example of virtuality-reality overlapping.

FIG. 2A is an example of virtuality-reality overlapping with better effect.

FIG. 2B is an example of virtuality-reality overlapping with poor effect.

DETAILED DESCRIPTION OF THE INVENTION

Technical terms are used in the specification with reference to generally-known terminologies used in the technology field. For any terms described or defined in the specification, the descriptions and definitions in the specification shall prevail. Each embodiment of the present disclosure has one or more technical characteristics. Given that each embodiment is implementable, a person ordinarily skilled in the art can selectively implement or combine some or all the technical characteristics of any embodiment of the present disclosure.

Figure 3:
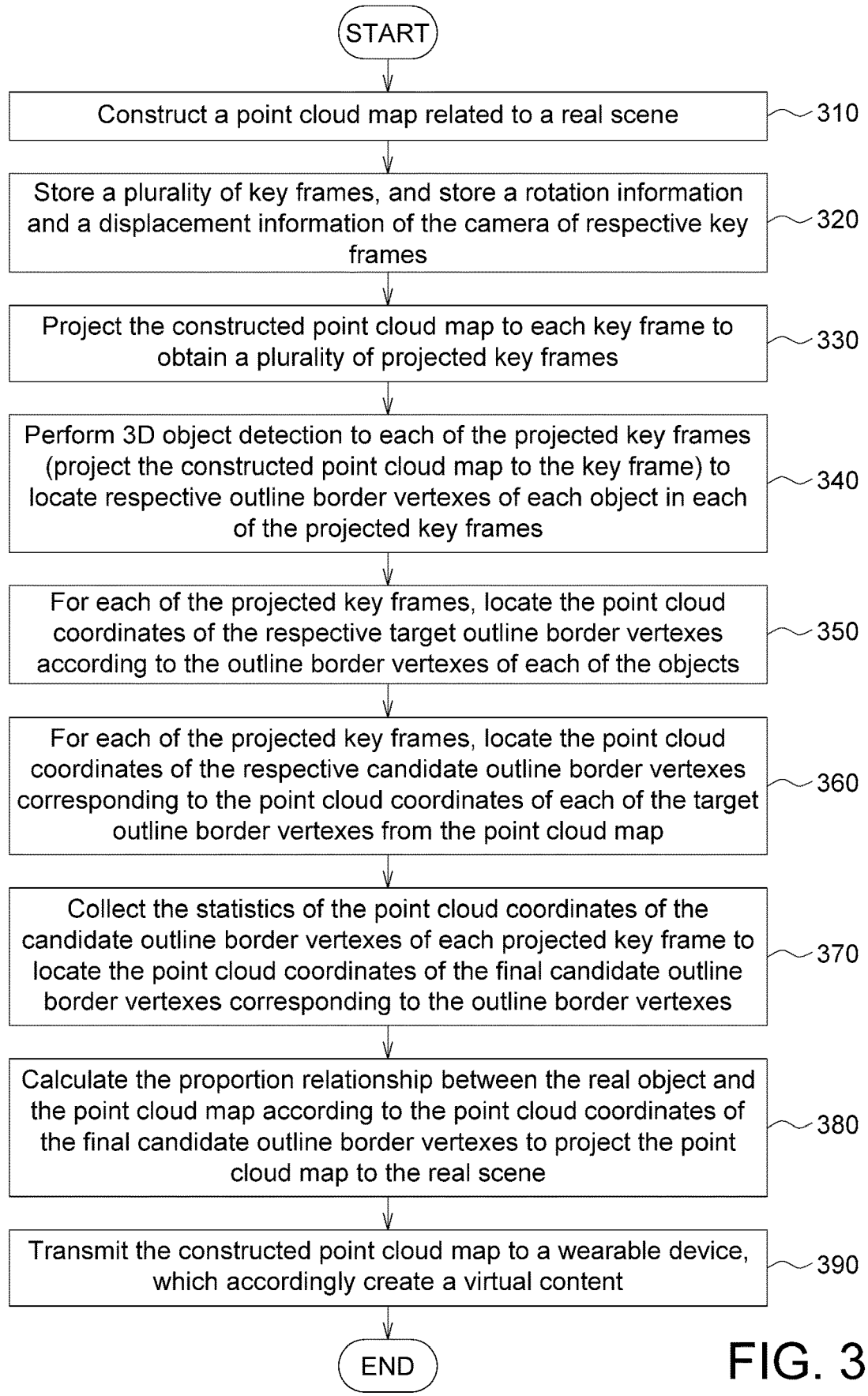
FIG. 3 is a flowchart of a virtuality-reality overlapping method according to an embodiment of the invention.
Figure 4:
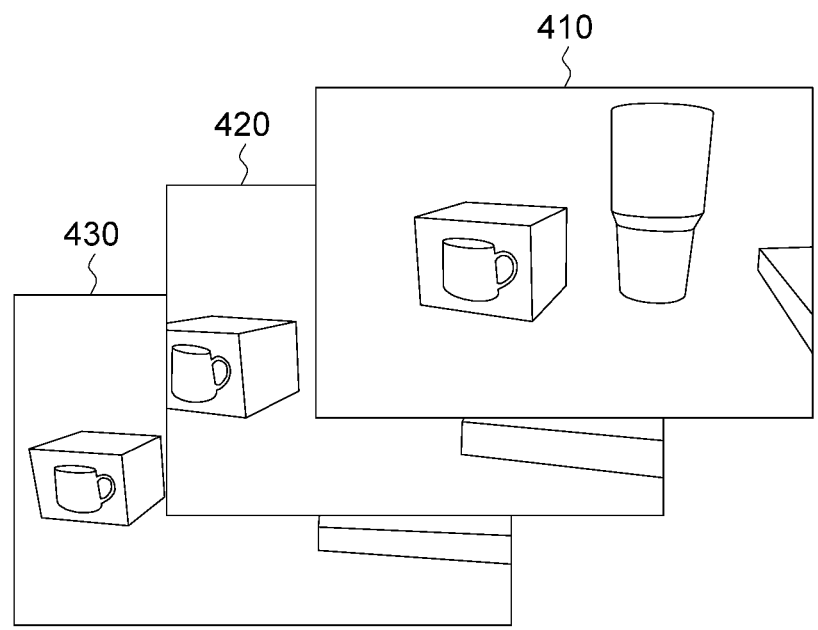
FIG. 4 is an example of a plurality of photos of a plurality of objects in the scene according to an embodiment of the invention.
Figure 5:
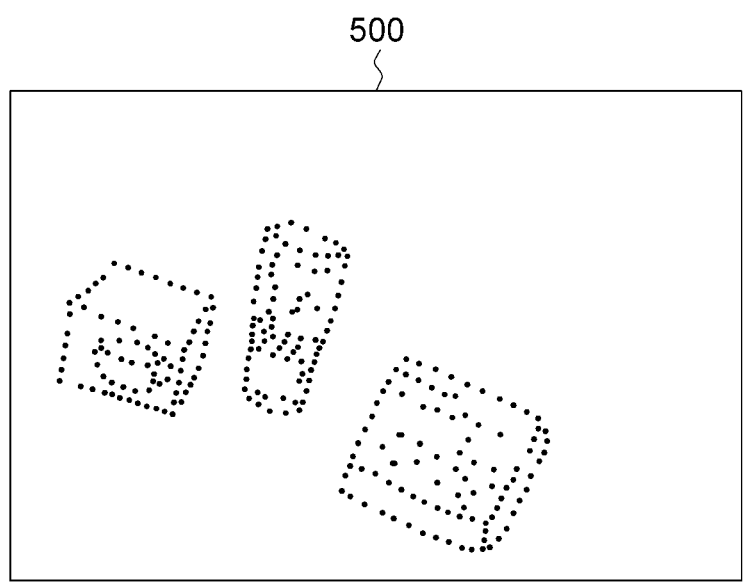
FIG. 5 is an example of a constructed point cloud map according to an embodiment of the invention.

FIG. 3 is a flowchart of a virtuality-reality overlapping method according to an embodiment of the invention. In step 310 as indicated in FIG. 3, a point cloud map related to a real scene is constructed. In an illustrative rather than restrictive sense, the details of step 310 may include: the user moves slowly to shoot a plurality of photos of all objects in the scene with a calibrated hand-held camera or mobile phone (may also be referred as image capture device), and further stores the photos in a memory device (not illustrated) to construct the point cloud map. The user shoots the entire environment from multiple angles and directions with the calibrated hand-held camera or mobile phone. FIG. 4 is an example of photos 410-430 of a plurality of objects in the scene according to an embodiment of the invention. FIG. 5 is an example of a constructed point cloud map according to an embodiment of the invention.

In step 320, a plurality of key frames of the object photos obtained in step 310 are stored in the memory device, and a rotation information and a displacement information of the camera of respective key frames are stored in the memory device.

Figure 6:
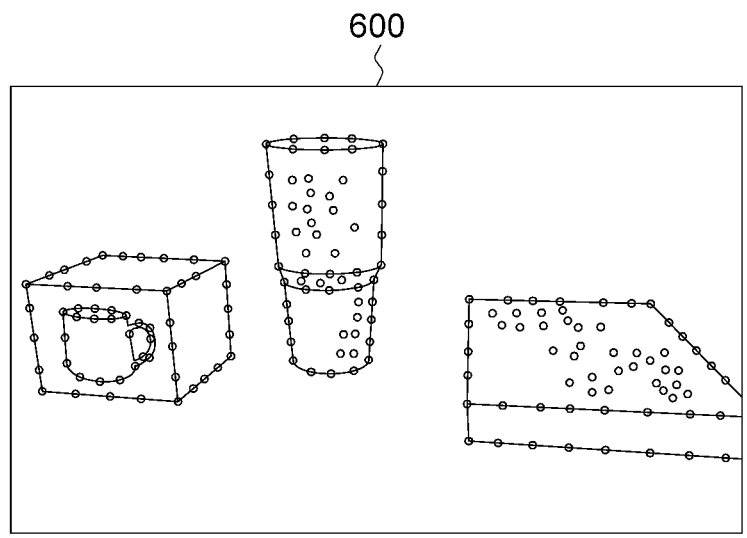
FIG. 6 is a result of projecting the point cloud map to one of the key frames according to an embodiment of the invention.

In step 330, the constructed point cloud map is projected to each key frame to obtain a plurality of projected key frames. FIG. 6 is a result of projecting the point cloud map to one of the key frames to obtain the projected key frame 600.

Figure 7:
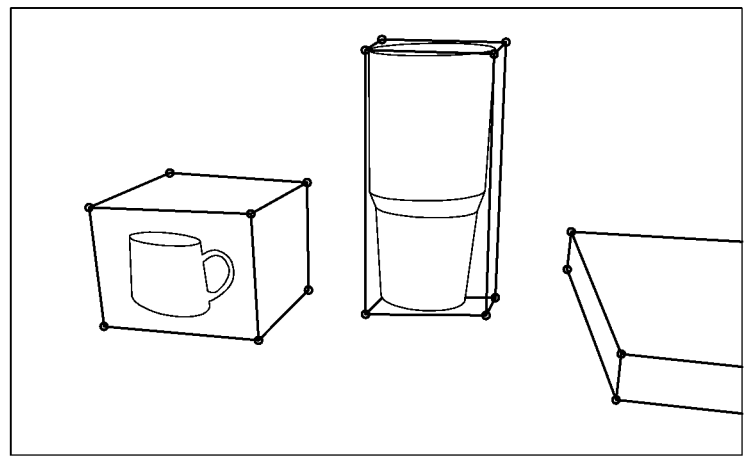
FIG. 7 is an example of three-dimension (3D) object detection according to an embodiment of the invention.
Figure 8:
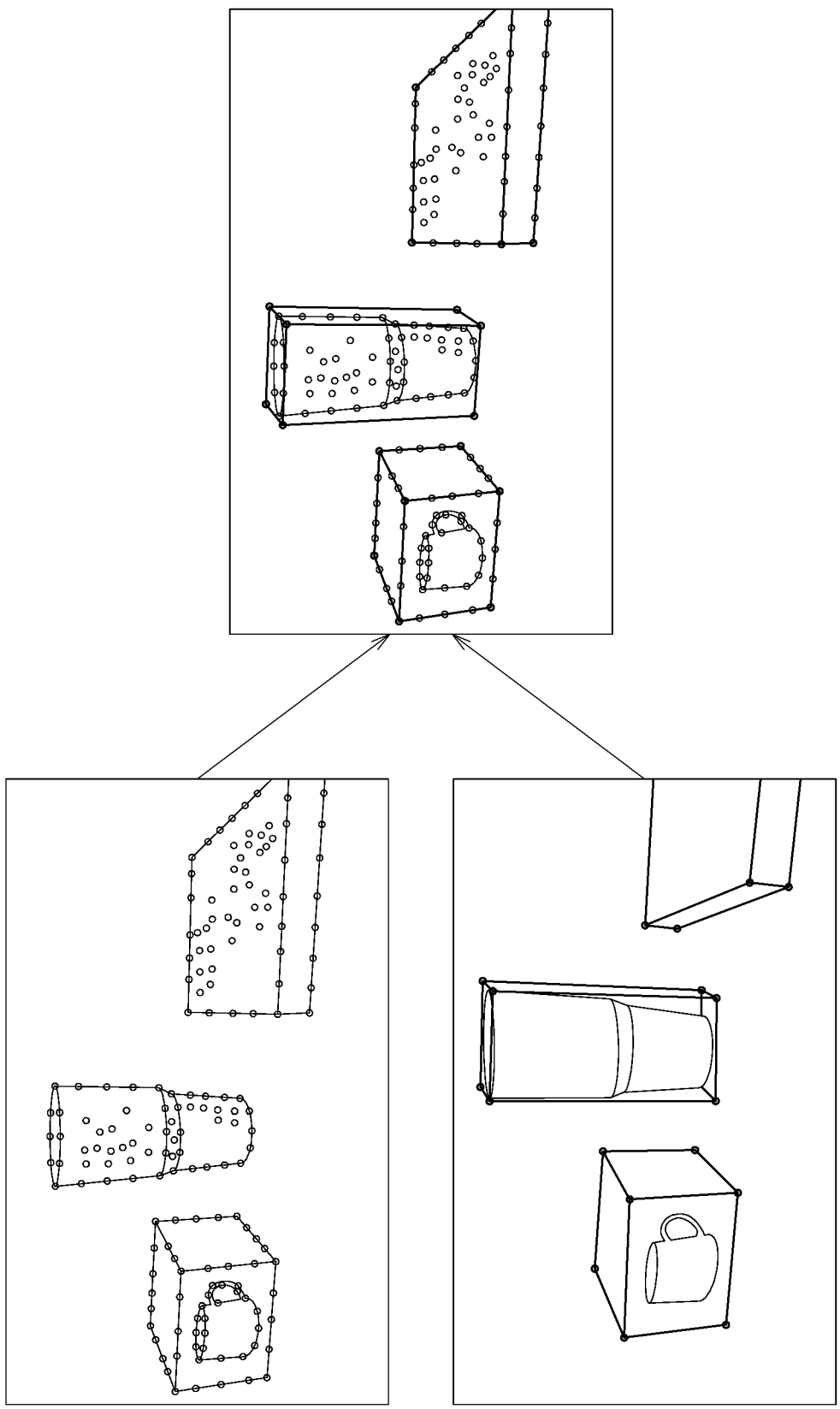
FIG. 8 is a schematic diagram of performing 3D object detection to the projected key frames according to an embodiment of the invention.

In step 340, three-dimension (3D) object detection is performed to each of the projected key frames (the constructed point cloud map is projected to the key frames) to locate respective outline border vertexes of each object in each of the projected key frames. FIG. 7 is an example of 3D object detection according to an embodiment of the invention. In an embodiment, 3D object detection can be performed to the projected key frame by using the you-only-look-once (YOLO) technology. The YOLO technology relates to a high efficiency neural network algorithm used in object detection. The advantages of the YOLO technology include: less image recognition (only one image needs to be recognized), fast execution speed and low error rate in background detection. FIG. 8 is a schematic diagram of performing 3D object detection to the projected key frames according to an embodiment of the invention.

Figure 9A:
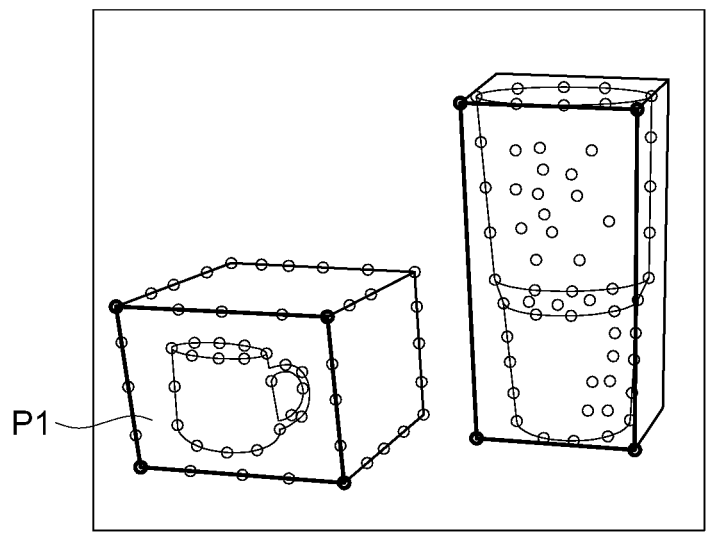
FIGS. 9A-9D are schematic diagrams of the point cloud coordinates of the target outline border vertexes according to an embodiment of the invention.
Figure 9B:
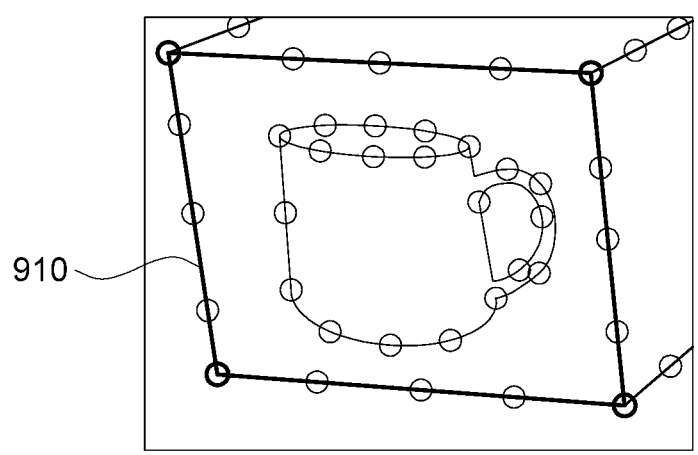
Figure 9C:
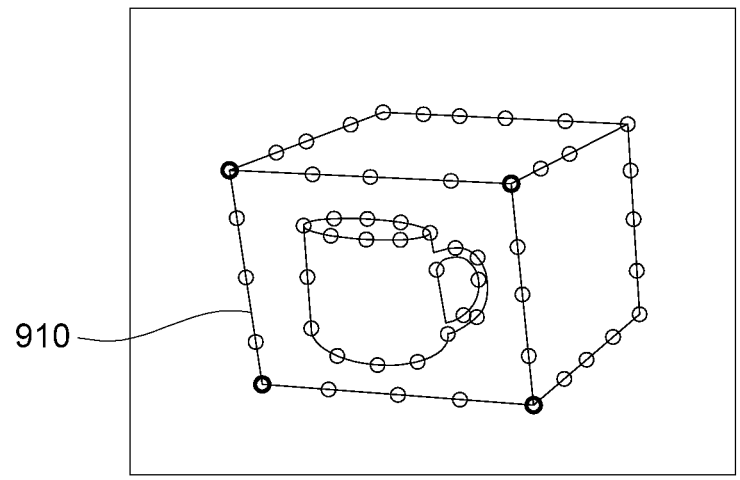
Figure 9D:
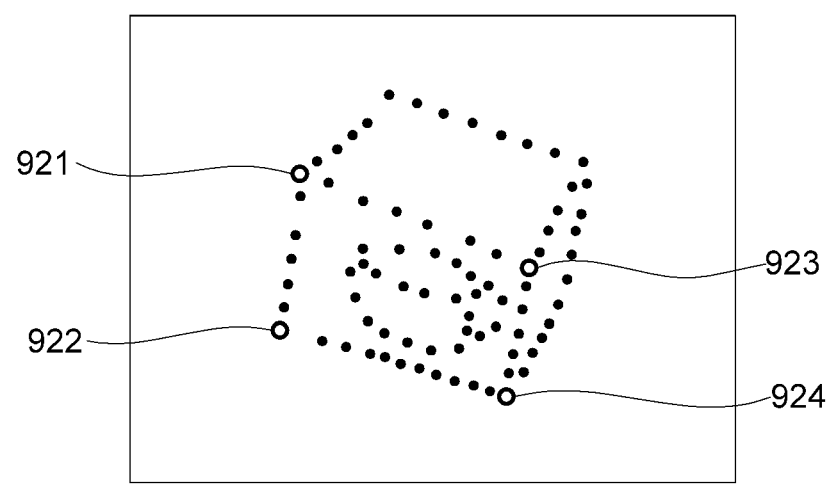

In step 350, for each of the projected key frames, the point cloud coordinates of the respective target outline border vertexes are located from the point cloud map according to the outline border vertexes of each of the objects, wherein, for each of the projected key frames, the point cloud coordinates of the target outline border vertexes are closest to the outline border vertexes on the point cloud map. In an embodiment of the invention, the entire bounding box of the object can be detected by using 3D object detection, that is, multiple planes of the object are detected. Then, the one of the planes with a largest number of point clouds (also referred as target plane) is located, so that the target plane can be captured. All point clouds on the captured target plane are calculated to obtain a 3D projection plane of the captured plane. After the 3D projection plane of the captured target plane is obtained, the 4 outline border vertexes of the object are projected to the 3D projection plane to locate the point cloud coordinates of the respective target outline border vertexes closest to each of the vertexes. FIGS. 9A-9D are schematic diagrams of the point cloud coordinates of the target outline border vertexes according to an embodiment of the invention. As indicated in FIG. 9A, plane P1 has a largest number of point clouds, and is therefore regarded as the target plane. All point clouds on the plane P1 are calculated to obtain a 3D projection plane 910 of the target plane as indicated in FIG. 9B. After the 3D projection plane 910 is obtained, the 4 vertexes of the object are projected to the 3D projection plane 910 as indicated in FIG. 9C. The point cloud coordinates of the respective target outline border vertexes 921, 922, 923 and 924 closest to each of the vertexes are obtained as indicated in FIG. 9D.

Figure 10:
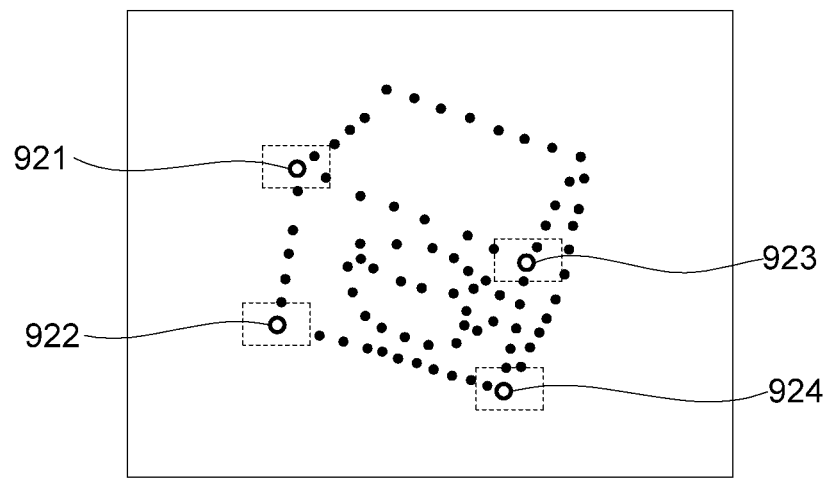
FIG. 10 is a schematic diagram of locating the point cloud coordinates of the candidate outline border vertexes according to an embodiment of the invention.

In step 360, for each of the projected key frames, the point cloud coordinates of the respective candidate outline border vertexes corresponding to the point cloud coordinates of each of the target outline border vertexes are located from the point cloud map. FIG. 10 is a schematic diagram of locating the point cloud coordinates of the candidate outline border vertexes according to an embodiment of the invention. Firstly, a distance threshold value is set. Then, a screening process is performed according to the distance threshold value. The screening process is exemplified in FIG. 10 but is not limited thereto. For the point cloud coordinates of each of the target outline border vertexes (the point cloud coordinates of each of the target outline border vertexes 921, 922, 923 and 924 as indicated in FIG. 9), respective distances between the point cloud coordinates of each of the target outline border vertexes and all points on the point cloud map are calculated, the point clouds whose distances are less than a distance threshold value are kept as the point cloud coordinates of the candidate outline border vertexes, but the point clouds whose distances are greater than the distance threshold value are excluded.

Figure 11A:
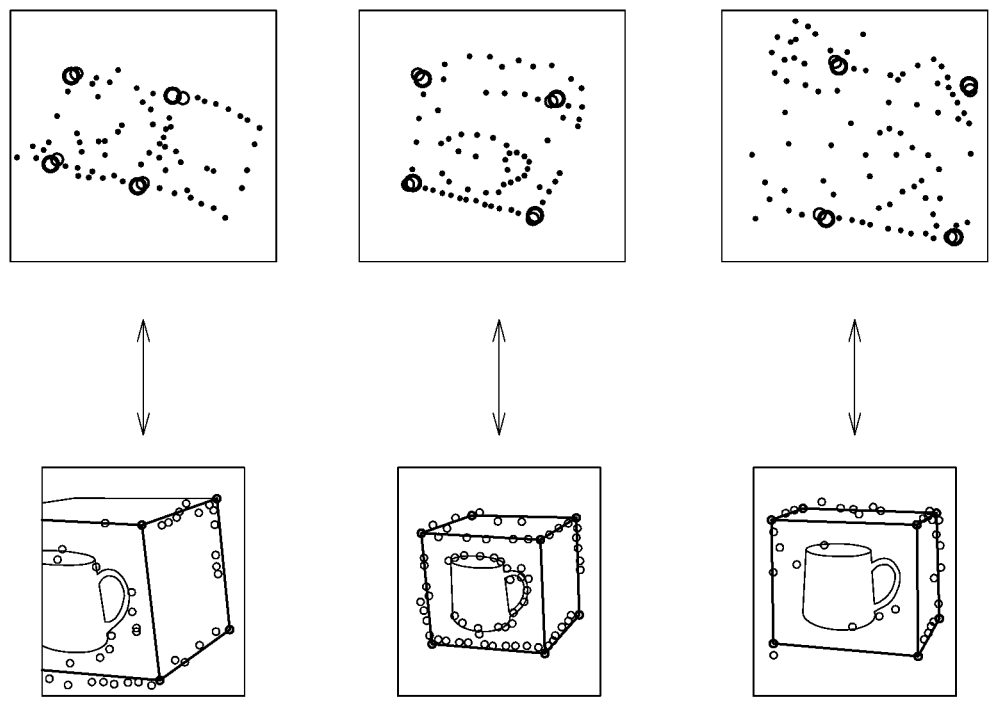
FIG. 11A is a schematic diagram of the point cloud coordinates of the respective candidate outline border vertexes of each projected key frame according to an embodiment of the invention.
Figure 11B:
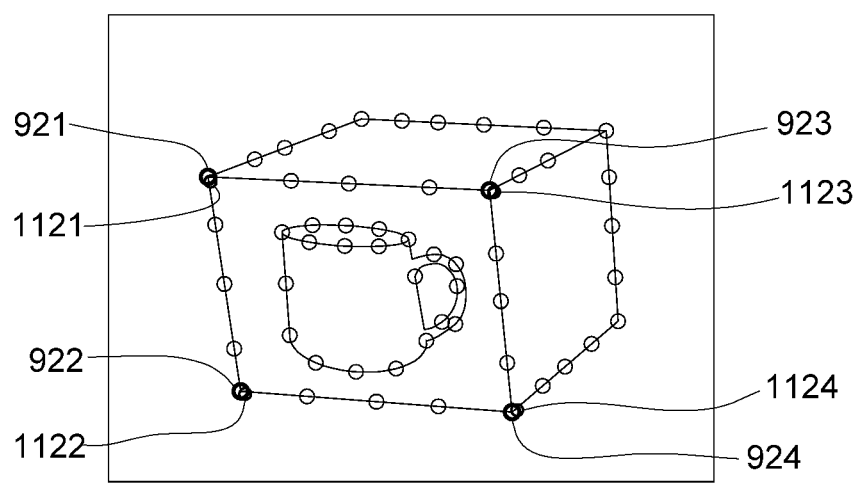
FIG. 11B is a schematic diagram of the point cloud coordinates of the final candidate outline border vertexes on the point cloud map according to an embodiment of the invention.

In step 370, the statistics of the point cloud coordinates of the candidate outline border vertexes of each projected key frame is collected to locate the point cloud coordinates of the final candidate outline border vertexes corresponding to the outline border vertexes from the point cloud map. In an embodiment of the invention, the above screening process is performed to each projected key frame to locate the point cloud coordinates of the respective candidate outline border vertexes of each projected key frame (as indicated in FIG. 11A), and the point cloud coordinates of the final candidate outline border vertexes 1121, 1122, 1123 and 1124 (as indicated in FIG. 11B) corresponding to the outline border vertexes are located from the point cloud map according to the statistics of the point cloud coordinates of the respective candidate outline border vertexes of each projected key frame collected by such as majority vote. For example, according to the statistic result, the point cloud coordinates of the one candidate outline border vertex with a largest number of occurrences is located among the point cloud coordinates of the candidate outline border vertexes and used as the point cloud coordinates of the final candidate outline border vertex. The point cloud coordinates of the final candidate outline border vertexes 1121, 1122, 1123 and 1124 are respectively related to the outline border vertexes.

In an embodiment of the invention, the reason for locating the point cloud coordinates of the final candidate outline border vertexes by using majority vote is as follows. If the point cloud coordinates of the final candidate outline border vertexes corresponding to the outline border vertexes are located from the point cloud map by the screening process using one single key frame, the obtained point cloud coordinates of the final candidate outline border vertexes will have a large bias in case the shooting angel of the single key frame be skewed. Therefore, in an embodiment of the invention, multiple key frames are used to achieve multiple view angles and avoid the obtained point clouds coordinates of the final candidate vertexes having a large bias.

That is, in an embodiment of the invention, the point cloud coordinates of the final candidate outline border vertexes are located from the point cloud map according to the outline border vertexes. Through the use of depth information (can be provided by an image capture device such as a camera or a mobile phone) and the switch between multiple key frame angles, screening accuracy can be increased, and the projection on a key frame from a remote point will not be misjudged as the projection from a nearest point.

Figure 12:
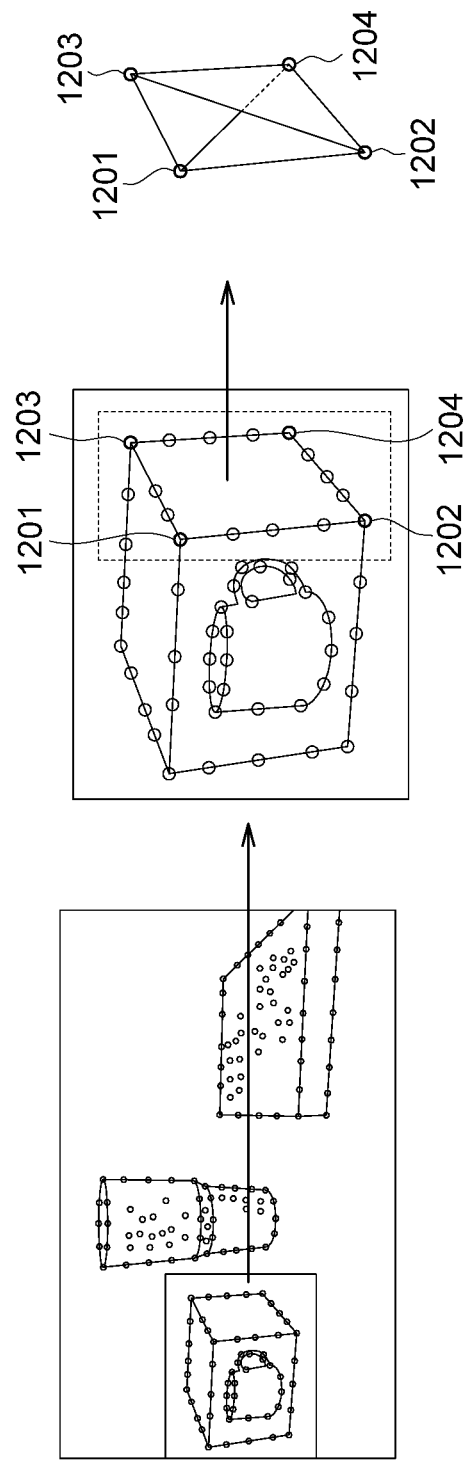
FIG. 12 is a schematic diagram of estimating the point cloud coordinates of the fourth final candidate outline border vertex by using geometric structure calculation according to an embodiment of the invention, (suppose the outline border has a rectangular shape).

During the shooting process, if the object tilts at a large angle or is placed at a bad angle or the photo shot by the user from a particular angle is not satisfactory, the point clouds will be sparse or even extinct near the outline border vertexes on the point cloud map. Under such circumstance, the point cloud coordinates of the final candidate outline border vertexes may not be obtained. In an embodiment of the invention, the structure and the outline border shape (such as rectangle or oblong) of the object can be detected by using 3D object detection. Therefore, geometric structure calculation can be performed according to the point cloud coordinates of other final candidate outline border vertexes to estimate the point cloud coordinates of the final candidate outline border vertexes that cannot be obtained. FIG. 12 is a schematic diagram of estimating the point cloud coordinates of the fourth final candidate outline border vertex by using geometric structure calculation according to an embodiment of the invention (suppose the outline border has a rectangular shape). As indicated in FIG. 12, due to the poor shooting effect, the point cloud coordinates of the fourth outline border vertex of the final candidate outline border vertexes 1204 cannot be obtained. Therefore, the point cloud coordinates of the fourth vertex of the final candidate outline border vertexes 1204 can be estimated from the point cloud coordinates of the other 3 outline border vertexes 1201, 1202 and 1203 of the final candidate outline border vertexes by using geometric structure calculation.

Figure 13:
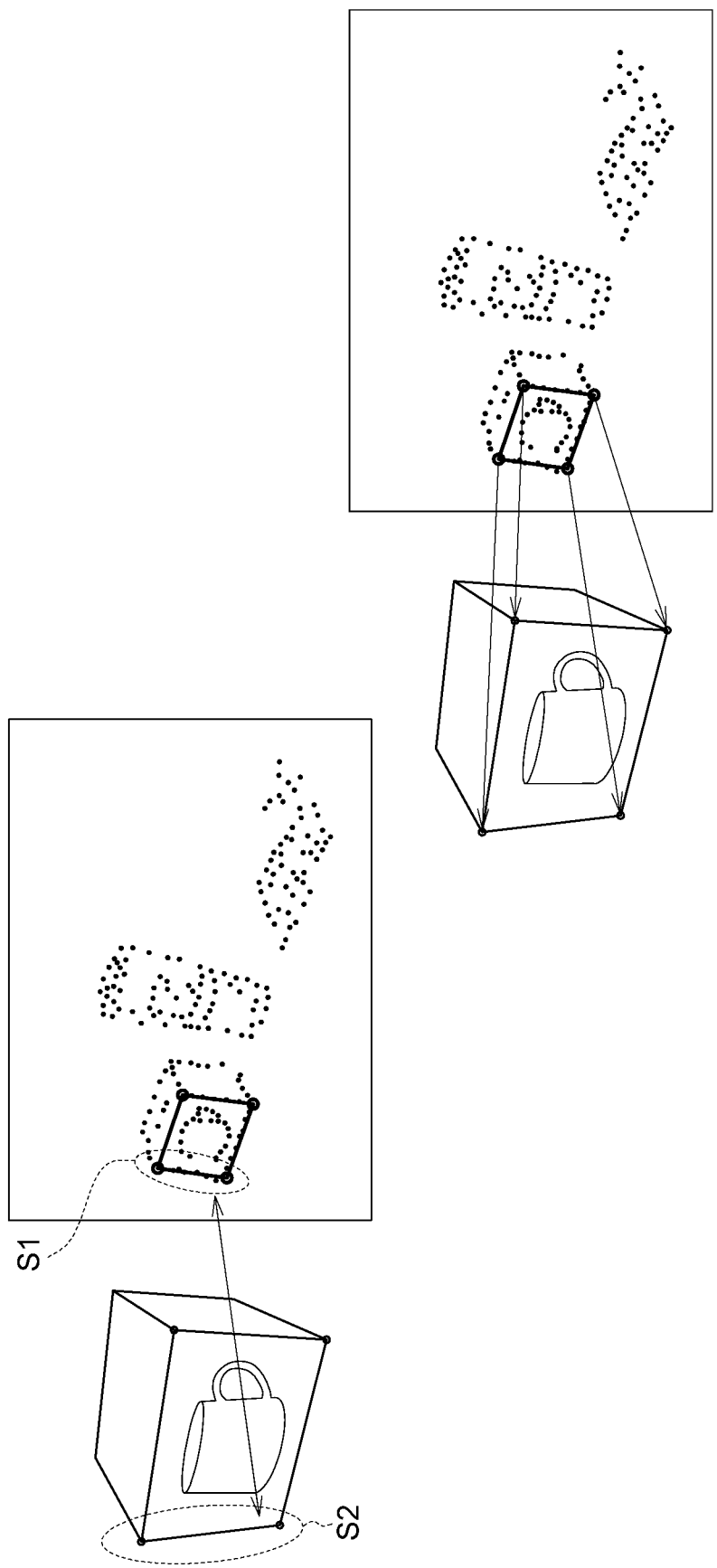
FIG. 13 is a schematic diagram of calculating a proportion relationship according to an embodiment of the invention.

In step 380, the proportion relationship between the real object and the point cloud map is calculated according to the point cloud coordinates of the final candidate outline border vertexes to project the point cloud map to the real scene. Besides, the bias of the point cloud map can be corrected (the bias of the point cloud map can be selectively corrected). FIG. 13 is a schematic diagram of calculating a proportion relationship according to an embodiment of the invention. After the point cloud coordinates of the final candidate outline border vertexes on the point cloud map are obtained, the size S1 of the object on the point cloud map (also referred as point clouds size) as well as the real size S2 of the object in the real world will be known. Thus, the proportion relationship between the point clouds size S1 and the real size S2 can be obtained. After the proportion relationship is obtained, the point cloud map can be projected to and automatically aligned with the real scene.

Figure 14:
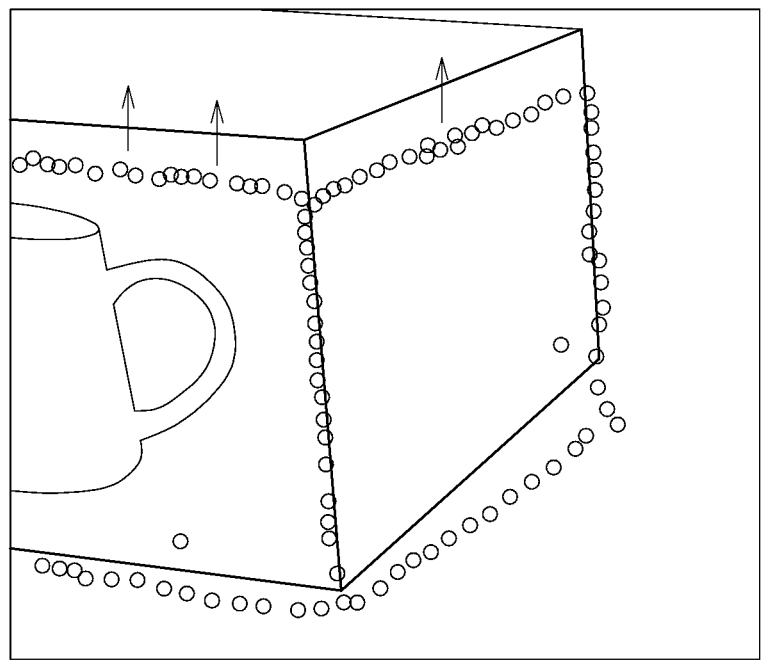
FIG. 14 is a schematic diagram of correcting the skewness of the point cloud map according to an embodiment of the invention.

If the point cloud map is skewed or deformed, in an embodiment of the invention, the skewness or deformation of the point cloud map can be corrected. In an embodiment of the invention, the coordinates of the vertexes of the object and the point cloud coordinates of the final candidate outline border vertexes corresponding to the coordinates of the vertexes are located from the point cloud map by using 3D object detection. The skewness or deformation of the point cloud map can be adjusted or corrected, such that the virtual content can be overlapped or tracked with high accuracy. FIG. 14 is a schematic diagram of correcting the skewness of the point cloud map according to an embodiment of the invention. As indicated in FIG. 14, since the point cloud map is skewed and the coordinates of the vertexes of the object are obtained by using 3D object detection, the skewness of the point cloud map can be corrected.

In step 390, the constructed point cloud map is transmitted to a wearable device (such as Google glasses or robot vision device), which accordingly create a virtual content. When the user views the real scene through the wearable device (such as Google glasses or robot vision device), the wearable device can project a virtual content on the lens to overlap the virtual content with the real scene. Let FIG. 1 be taken for example. The constructed point cloud map of the real scene 120 is transmitted to the wearable device, which accordingly creates a virtual content 110. When the user views the real scene 120 through the wearable device, the wearable device can project the virtual content 110 on the lens and overlap the virtual content 110 with the real scene 120. That is, what is viewed by the user is a result of virtuality-reality overlapping.

Figure 15:
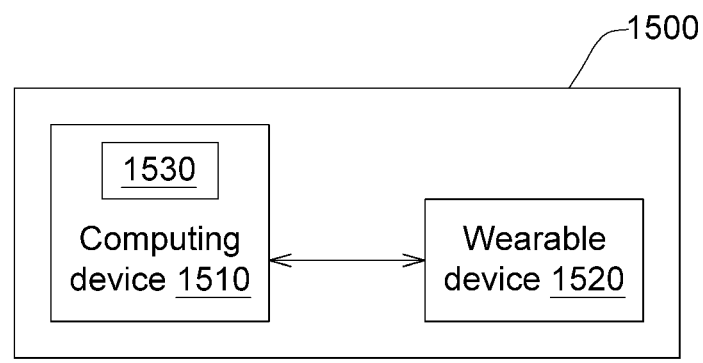
FIG. 15 is a schematic diagram of a virtuality-reality overlapping system according to an embodiment of the invention.

FIG. 15 is a schematic diagram of a virtuality-reality overlapping system according to an embodiment of the invention. As indicated in FIG. 15, virtuality-reality overlapping system 1500 includes a computing device 1510 and a wearable device 1520. The computing device 1510 and the wearable device 1520 can be coupled in a wired or a wireless manner. In an embodiment of the invention, steps 310-380 are performed by the computing device 1510, wherein, the computing device 1510 further includes a memory device 1530. Additionally, the computing device 1510 includes an image capture device; or, the computing device 1510 can be connected to an external image capture device, and the said design is still within the spirit of the invention. After receiving the point cloud map constructed by the computing device 1510, the wearable device 1520 accordingly creates a virtual content and further overlaps the virtual content with the real scene.

According to the invention, the point cloud map reconstruction technology is used to construct a point cloud map by scanning the real scene. 3D object detection is used to detect respective outline border vertexes of a plurality of objects. According to the outline border vertexes of the objects, the point cloud coordinates of the final candidate outline border vertexes are located according to a screening result of multi-angle and multi-faceted key frames. Then, the point cloud map is projected to the real scene for overlapping a 2D/3D virtual content with the real scene.

Moreover, the wearable device can accurately place the virtual content by instant tracking without using any auxiliary objects. This is because a point cloud map constructed in the invention can be accurately overlapped with the real scene. The virtual content can be a 2D or a 3D content.

To summarize, the invention has the following advantages: (1) the biased or skewed part of the point cloud map, which occurs when the user shoots a photo with a high degree of freedom, can be corrected to increase the tracking accuracy. (2) Since the scale of the constructed point cloud map is consistent, the constructed point cloud map can be automatically projected to the real scene for the convenience of placing or editing the 2D/3D virtual content. (3) With the instant tracking overlapping, the 2D/3D virtual content can be accurately placed on the real scene.

While the invention has been described by way of example and in terms of the preferred embodiment(s), it is to be understood that the invention is not limited thereto. On the contrary, it is intended to cover various modifications and similar arrangements and processes, and the scope of the appended claims therefore should be accorded the broadest interpretation to encompass all such modifications and similar arrangements and processes.

What is claimed is:

1. A virtuality-reality overlapping method, comprising:
    shooting a real scene by an image capture device to construct a point cloud map;
    storing a plurality of key frames in a memory device;
    projecting the point cloud map to each of the key frames to obtain a plurality of projected key frames;
    performing three-dimension (3D) object detection to each of the projected key frames to locate respective outline border vertexes of a plurality of objects in each of the projected key frames;
    for each of the projected key frames, locating the point cloud coordinates of a plurality of target outline border vertexes from the point cloud map according to the outline border vertexes of the objects, wherein, for each of the projected key frames, the point cloud coordinates of the target outline border vertexes respective are closest to the outline border vertexes on the point cloud map;
    for each of the projected key frames, locating the point cloud coordinates of a plurality of candidate outline border vertexes corresponding to the point cloud coordinates of the target outline border vertexes from the point cloud map;
    collecting the statistics of the point cloud coordinates of the candidate outline border vertexes of the projected key frames to locate the point cloud coordinates of a plurality of final candidate outline border vertexes corresponding to the outline border vertexes from the point cloud map;
    calculating a proportion relationship between the objects and the point cloud map according to the point cloud coordinates of the final candidate outline border vertexes to project the point cloud map to the real scene; and
    transmitting the constructed point cloud map to a wearable device, which accordingly creates a virtual content and further overlaps the virtual content with the real scene.

2. The virtuality-reality overlapping method according to claim 1, wherein, when storing the key frames in the memory device, the method further comprises storing a rotation information and a displacement information of the image capture device of respective key frames in the memory device.

3. The virtuality-reality overlapping method according to claim 1, wherein, the step of locating the outline border vertexes of the objects in each of the projected key frames comprises:
    detecting multiple planes of the object by using 3D object detection;
    locating a target plane comprising a largest number of point clouds among the planes to capture the target plane;
    calculating a plurality of point clouds of the target plane to obtain a 3D projection plane of the target plane; and
    projecting the outline border vertexes of the object to the 3D projection plane to locate the point cloud coordinates of the target outline border vertexes closest to each of the outline border vertexes.

4. The virtuality-reality overlapping method according to claim 1, wherein, the step of locating the point cloud coordinates of the candidate outline border vertexes comprises:
    for the point cloud coordinates of each of the target outline border vertexes, calculating respective distances between the point cloud coordinates of each of the target outline border vertexes and all points on the point cloud map; and
    keeping the point clouds whose distances are less than a distance threshold value as the point cloud coordinates of the candidate outline border vertexes, but excluding the point clouds whose distances are greater than the distance threshold value.

5. The virtuality-reality overlapping method according to claim 1, wherein, the step of locating the point cloud coordinates of the final candidate outline border vertexes comprises:

locating the point cloud coordinates of the respective candidate outline border vertexes in each of the projected key frames and collecting the statistics thereof to locate the point cloud coordinates of the final candidate outline border vertexes.

6. The virtuality-reality overlapping method according to claim 1, wherein, the method comprises performing geometric structure calculation to the point cloud coordinates of the final candidate outline border vertexes to estimate the point cloud coordinates of another final candidate outline border vertex.

7. The virtuality-reality overlapping method according to claim 1, further comprising: adjusting or correcting the point cloud map according to the point cloud coordinates of the final candidate outline border vertexes.

8. A virtuality-reality overlapping system, comprising:
a computing device, comprising a memory device; and
a wearable device coupled to the computing device, wherein,
an image capture device shoots a real scene, and the computing device constructs a point cloud map;
the computing device stores a plurality of key frames in the memory device;
the computing device projects the point cloud map to each of the key frames to obtain a plurality of projected key frames;
the computing device performs three-dimension (3D) object detection to each of the projected key frames to locate respective outline border vertexes of a plurality of objects in each of the projected key frames;
for each of the projected key frames, the computing device locates the point cloud coordinates of a plurality of target outline border vertexes on the point cloud map according to the outline border vertexes of the objects, wherein, for each of the projected key frames, the point cloud coordinates of the target outline border vertexes respective are closest to the outline border vertexes on the point cloud map;
for each of the projected key frames, the computing device locates the point cloud coordinates of a plurality of candidate outline border vertexes corresponding to the point cloud coordinates of the target outline border vertexes from the point cloud map;
the computing device collects the statistics of the point cloud coordinates of the candidate outline border vertexes of the projected key frames to locate the point cloud coordinates of a plurality of final candidate outline border vertexes corresponding to the outline border vertexes from the point cloud map;
the computing device calculates a proportion relationship between the objects and the point cloud map to project the point cloud map to the real scene according to the point cloud coordinates of the final candidate outline border vertexes; and
the computing device transmits the constructed point cloud map to the wearable device, which accordingly creates a virtual content and further overlaps the virtual content with the real scene.

9. The virtuality-reality overlapping system according to claim 8, wherein, when storing the key frames in the memory device, the computing device further stores a rotation information and a displacement information of the image capture device of respective key frames in the memory device.

10. The virtuality-reality overlapping system according to claim 8, wherein, when obtaining the outline border vertexes of the objects in each of the projected key frames,
the computing device detects multiple planes of the object by using 3D object detection;
the computing device obtains a target plane comprising a largest number of point clouds to capture the target plane among the planes;
the computing device calculates a plurality of point clouds of the target plane to obtain a 3D projection plane of the target plane; and
the computing device projects the outline border vertexes of the object to the 3D projection plane to locate the point cloud coordinates of the target outline border vertexes closest to each of the outline border vertexes.

11. The virtuality-reality overlapping system according to claim 8, wherein, when locating the point cloud coordinates of the candidate outline border vertexes,
for the point cloud coordinates of each of the target outline border vertexes, the computing device calculates respective distances between the point cloud coordinates of each of the target outline border vertexes and all points on the point cloud map; and
the computing device keeps the point clouds whose distances are less than a distance threshold value as the point cloud coordinates of the candidate outline border vertexes, but excludes the point clouds whose distances are greater than the distance threshold value.

12. The virtuality-reality overlapping system according to claim 8, wherein, when locating the point cloud coordinates of the final candidate outline border vertexes,
the computing device obtains and collects the statistics of the point cloud coordinates of the respective candidate outline border vertexes in each of the projected key frames to locate the point cloud coordinates of the final candidate outline border vertexes.

13. The virtuality-reality overlapping system according to claim 8, wherein, the computing device performs geometric structure calculation to the point cloud coordinates of the final candidate outline border vertexes to estimate the point cloud coordinates of another final candidate outline border vertex.

14. The virtuality-reality overlapping system according to claim 8, wherein, the computing device adjusts or corrects the point cloud map according to the point cloud coordinates of the final candidate outline border vertexes.

* * * * *